(12) United States Patent
Grabher et al.

(10) Patent No.: US 6,301,958 B1
(45) Date of Patent: Oct. 16, 2001

(54) PROCESS FOR DETERMINING THE FUEL CONSUMPTION OR THE OPERATING STATUS OF COMBUSTION ENGINES

(75) Inventors: Reinhard Grabher, Lustenau; Thomas Flauger, Götzis; Karl-Heinz Feierle, Dornbirn, all of (AT)

(73) Assignee: Kräutler Gesellschaft mbH & Co., Lustenau (AT)

( * ) Notice: Subject to any disclaimer, the term of this patent is extended or adjusted under 35 U.S.C. 154(b) by 0 days.

(21) Appl. No.: 09/205,937

(22) Filed: Dec. 4, 1998

(30) Foreign Application Priority Data

Jun. 5, 1998 (AT) .................................................. 973/98

(51) Int. Cl.[7] .......................... G01M 19/00; G01M 15/00
(52) U.S. Cl. .............................. 73/118.1; 73/113; 73/114
(58) Field of Search ................................. 123/25 J, 446, 123/357; 73/113, 114, 118.1

(56) References Cited

U.S. PATENT DOCUMENTS

| | | | |
|---|---|---|---|
| 4,459,943 | * 7/1984 | Goodman | 123/25 J |
| 5,205,161 | 4/1993 | Erwin | 73/114 |
| 5,738,071 | * 4/1998 | Smith, Jr. et al. | 123/357 |
| 5,740,782 | * 4/1998 | Lowi, Jr. | 123/446 |

FOREIGN PATENT DOCUMENTS

| | | |
|---|---|---|
| 400 766 B | 3/1996 | (AT) . |
| 0 572 621 B1 | 9/1996 | (EP) . |

* cited by examiner

*Primary Examiner*—Benjamin R. Fuller
*Assistant Examiner*—Maurice Stevens
(74) *Attorney, Agent, or Firm*—Baker & Daniels

(57) ABSTRACT

A process for determining the fuel consumption or operating status of combustion engines having a fuel injection pump, a supply line connecting a fuel supply container to the fuel injection pump, and a return line connecting the fuel injection pump to the fuel supply container. Measuring devices are provided in each of the supply and return lines for recording flowing fuel volumes in the supply and return lines. The measuring devices each having a signal emitter or sensor sensing signals that are allocated respectively to the measuring devices. The measuring device in the return line includes at least two signal emitters or sensors. Signals are emitted from the measuring device in the return line that are a function of respective forward and reverse flow directions, which signals are supplied to a signal selector. The signals from respective equivalent flow directions are added, and the signals obtained from one flow direction are subtracted from the signals obtained from another flow direction to form a signal difference, which may be used for fuel consumption counting or display.

12 Claims, 1 Drawing Sheet

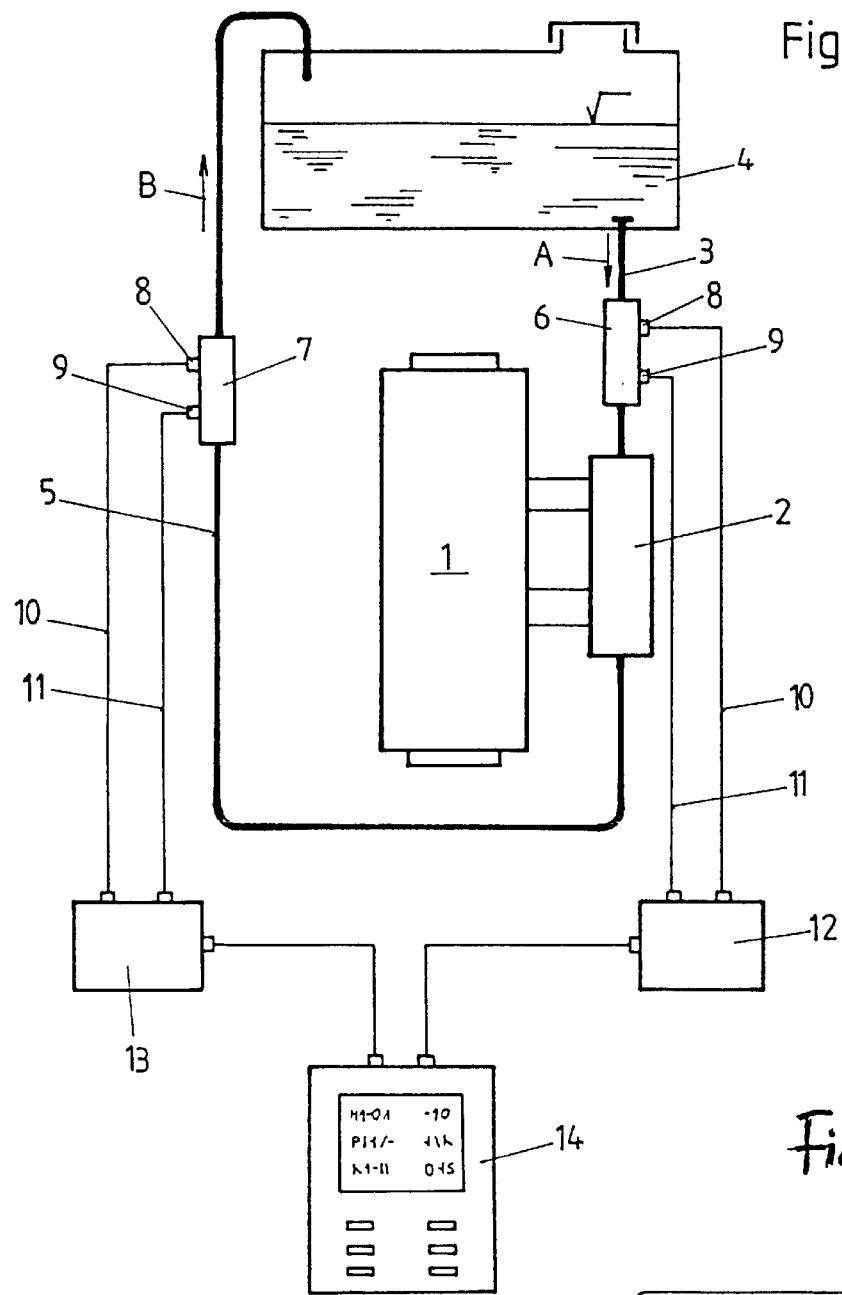

PROCESS FOR DETERMINING THE FUEL CONSUMPTION OR THE OPERATING STATUS OF COMBUSTION ENGINES

The invention involves a process for determining the fuel consumption or the operating status in or of combustion engines having a fuel injection pump based on the characteristics of the generic concept of patent claim 1.

In the processes, which have been used so far and are thus previously known, the pulses sent from the measuring devices were added up, possibly adjusted and converted, and then the sum of these pulses was called in to count and display the fuel consumption. If in order to check the measurement accuracy in succession, the effective content of the fuel supply container was compared with the values obtained by the measurement, then some quite considerable deviations had to be determined, which made the functionality of this type of measurement appear questionable. Such deviations appear in the following cases:

For diesel generators and for vehicle motors in that the tank content and the measurement value do not agree.

For diesel generators during acceptance tests and installation and start-up, in that in the fuel system for the time of the testing, a container is integrated with which the fuel quantity is weighed. Together with the density of the fuel, the consumption is then checked relative to the assured property. In this process, deviations of the throughput meter also accrue.

In testing stands, the consumption values deviate so greatly from the theoretically determined values, that the result of the consumption measurement is simply implausible.

Intensive and long term tests and studies have shown that for high-performance combustion engines, especially for diesel assemblies, whose fuel injector pumps are made as piston pumps, because of the constructive conditions and because of the operational methods of such a piston pump, pressure waves and pressure oscillations of considerable dimensions can be generated in the fuel lines. These pressure waves and oscillations are sometimes so considerable and act in such a manner that the fuel changes the flow direction prescribed for it, i.e. flows back, so to speak, in the aforementioned lines as a function of the frequency of these waves and oscillations, even if only for a short time. The fuel quantities involved here are, for high-performance assemblies, not to be ignored as seen over the entire operating time of the assembly, if this involves determining and recording the fuel consumption of the assembly as exactly as possible. Furthermore, from the actual fuel consumption as well as the flow direction and the frequency of the change in the flow direction, conclusions can be drawn about the operating status of the combustion engine.

The purpose and goal of the invention is thus to further develop the process in such a manner that measurement results involving the fuel consumption can be obtained that are as exact as possible and take into account the conditions as much as possible. In order to achieve this purpose, the invention proposes those measures that are the content and object of the characterizing part of patent claim 1. The occurrence of pressure pulsations in the low pressure system is described in the report "Injector pump cavitation, Project No. 558, Volume 629, 1996, Frankfurt am Main" of the Combustion Engine Research Organization e.V. (FVV). The subject of the report is the development of dampers to prevent damages to the injector pump caused by cavitation. The research work does not recognize the effect of the flow reversal.

Functionally, a screw spindle displacement volume meter having at least two sensors offset from each other, is used as the measuring device. Screw spindle displacement volume meters of this type are, for example, known from the patent AT 400 766 B. However, a type of screw spindle displacement volume meters could also be used which uses a serrated or tooth lock washer as the pulse-emitting device, as is known in connection with the patent EP 0 572 621 B1, where in this case two sensors offset at angles on the perimeter of the housing are provided per pulse emitting device, so that temporally offset pulse sequences are obtained, from the progression of which the respective flow direction can be derived.

Using the drawing, the invention is depicted in greater detail. Shown are:

FIG. 1 schematic diagram of the measurement arrangement and

FIG. 2 an enlarged representation of the display field of the counter

A high-performance diesel assembly 1, for example a diesel motor, has a fuel injector pump 2, which is constructed as a piston pump and which is connected to a fuel supply container 4 via a supply line 3. The fuel delivered to the fuel injector pump 2, which, however, is unnecessary because of the changing performance specifications, is returned back to the fuel supply container 4 via the return line 5. Both in the supply line 3 as well as in the return line 5, a measurement device 6 or 7 respectively, which records the fuel volume flowing through, is provided. Both measurement devices are functionally constructed as screw spindle displacement volume meters. A screw spindle displacement volume meter of this type, which is used here, is, for example, shown and described in the patent AT 400 766 B. Each of these measuring devices has two sensors 8 and 9 responding to the number of revolutions of a screw spindle, such that these sensors 8 and 9 are arranged such that depending on the rotational direction and if necessary, the rotational speed of the screw spindle, different pulse sequences are obtained. The pulse sequences conducted by the sensors 8 and 9 of the two measurement devices 6 and 7 over the connection lines 10 and 11 to the pulse selectors 12 and 13 are thus a function of the respective rotational direction and if necessary, the rotational speed of a screw spindle and thus, of the respective flow-through direction of the measurement device. In the pulse selector 12, the pulses coming from the supply flow and the possible return flow of the fuel are processed, where the pulse number obtained here is a measure for the fuel quantity that has actually flowed to the fuel injector pump 2. Processing is done in a similar manner in the pulse selector 13, so that here a pulse number is obtained which corresponds to the fuel volume actually returned into the fuel supply container 4. In an evaluation device constructed as the counter 14, the fuel quantity that has flowed to the fuel injector pump 2 and the fuel quantity that was conducted back to the fuel supply container 4 are displayed, and furthermore, their difference and possibly the time-related quantity are displayed.

The pulses are determined as a function of the flow direction. In spite of the construction-related return flows of the fuel that occur periodically and for a short time period, the actual fuel consumption can be recorded with a high degree of accuracy thanks to the measure proposed.

Because of the construction-related operational method of the fuel injector pump constructed as a piston pump, the predominant part of the fuel quantity flows in the direction of the arrow shown in FIG. 1. The pressure fluctuations occurring in the lines 3 and 5, however, cause a short-term and periodic reversal of the flow direction of the fuel. The quantities of return flow accruing in this process, for high-performance assemblies and long operating times, can, thanks to the measure according to the invention, no longer misrepresent the measurement result since these quantities of return flow can now be recorded and observed in the displays.

From the ratio of the flow-through in the supply and return line to the user as well as from the frequency changes of the sensors, which are a measure for the flow-through variations, a conclusion can be made about operating status and dangers. Thus then, if consumption in relation to the circulation becomes too large, pressures can occur in the low pressure system which drop well below the desired value of approx. 8 bar. In this way the danger of cavitations increases, which can damage components of the motor, for example, the control edges of the injector piston pumps. If the flow-through varies too greatly, the cause can also be an unpermissably poor oil quality. Poor oil has a high viscosity, is more inert, and causes higher pressure pulses. These pressure pulses can again cause cavitation or stress components in a purely mechanically manner. Furthermore, it arises that pressure regulating valves in the low pressure system can be adjusted incorrectly. In the low pressure system, on the one hand, a certain system pressure must prevail, so that the filling of the injector pump delivery chambers is ensured; on the other hand, a pressure difference supports the fuel flow. When incorrectly adjusted, not only can a short-term, but also a lasting reversal of the flow direction can occur. Then, unfiltered fuel is taken out of the return line from the injector pump. By the measurement of the flow-through in the forward and return run, this behavior can be controlled. On the whole, the system can, if the flow-through is interpreted in the above context, not only be used as a flow-through measurement system, but also as a warning system. The measurement values obtained thus also function for the assessment of the operating condition. From data of this type it can also be recognized that possibly the device must be maintained and overhauled.

In the embodiment example shown according to FIG. 1, both in the supply line 3 as well as in the return line 5, measurement devices 6, 7 are arranged respectively, each of which has two signal emitters or sensors 8, 9. It is in the frame of the invention, exclusively in the return line 5, to use measuring devices of this structural type and in the supply line 3, measuring devices of the type having only one signal emitter or sensor. Also, using a device of this type, significant machine data can be recorded. In the figure description, pulses were mentioned. The concept of pulse is quite generally understood in the context of signal. Signals of this type can have very different shapes and designs. In so far as they can be detected as a function of the direction, they can be used for the application purposed described.

1 Diesel assembly
2 Fuel injector pump
3 Supply line
4 Fuel supply container
5 Return line
6 Measuring device—screw spindle displacement volume meter
7 Measuring device—screw spindle displacement volume meter
8 Sensor
9 Sensor
10 Connection line
11 Connection line
12 Pulse selector
13 Pulse selector
14 Counter

What is claimed is:

1. A process for determining at least one of fuel consumption and operating status of combustion engines having a fuel injection pump, a supply line connecting a fuel supply container and the fuel injection pump, and a return line connecting the fuel injection pump and the fuel supply container, said process comprising the steps of:

providing a measuring device in the supply line and a measuring device in the return line for recording a flowing fuel volume in the supply line and in the return line, the measuring device in the supply line and the measuring device in the return line each having a signal emitter or sensor sending signals that are allocated respectively to the measuring device in the supply line and to the measuring device in the return line, the measuring device in the return line having at least two signal emitters or sensors;

emitting signals from the measuring device in the return line that are a function of respective forward and reverse flow directions;

supplying the signals obtained from the forward and reverse flow directions to a signal selector;

adding the signals from respective equivalent flow directions;

subtracting the signals obtained from one flow direction from the signals obtained from another flow direction to form a signal difference; and using the signal difference thus obtained for fuel consumption counting or display.

2. The process according to claim 1, characterized in that in both in the return line as well as in the supply line one measuring device is allocated respectively, the measuring device in the supply line and the measuring device in the return line each having at least two signal emitters or sensors.

3. The process according to claim 1, characterized in that the measuring device in the return line comprises a screw spindle displacement volume meter having at least two sensors arranged offset from each other.

4. The process according to claim 2, characterized in that the measuring device in the supply line and the measuring device in the return line each comprise a screw spindle displacement volume meter having at least two sensors arranged offset from each other.

5. The process according to claim 2, characterized in that the signals emitted by the measuring device in the supply line and the measuring device in the return line are each analyzed by a respective signal selector, the output of the signal selectors connected to an analyzing element wherein the fuel consumption of the engine is calculated.

6. The process according to claim 1, further including the step of using the signal difference as a warning of a dangerous operating status of the engine.

7. A process for determining fuel consumption and operating status of combustion engines having a fuel injection pump, a supply line connecting a fuel supply container and the fuel injection pump, and a return line connecting the fuel injection pump and the fuel supply container, said process comprising the steps of:

providing a measuring device in the supply line and a measuring device in the return line for recording a flowing fuel volume in the supply line and in the return line, the measuring device in the supply line and the measuring device in the return line each having a signal emitter or sensor sending signals that are allocated respectively to the measuring device in the supply line and to the measuring device in the return line, the measuring device in the return line having at least two signal emitters or sensors;

emitting signals from the measuring device in the return line that are a function of respective forward and reverse flow directions;

supplying the signals obtained from the forward and reverse flow directions to a signal selector;

adding the signals from respective equivalent flow directions;

subtracting the signals obtained from one flow direction from the signals obtained from another flow direction to form a signal difference; and using the signal difference thus obtained for fuel consumption counting or display.

8. The process according to claim 7, characterized in that in both in the return line as well as in the supply line one measuring device is allocated respectively, the measuring device in the supply line and the measuring device in the return line each having at least two signal emitters or sensors.

9. The process according to claim 7, characterized in that the measuring device in the return line comprises a screw spindle displacement volume meter having at least two sensors arranged offset from each other.

10. The process according to claim 8, characterized in that the measuring device in the supply line and the measuring device in the return line each comprise a screw spindle displacement volume meter having at least two sensors arranged offset from each other.

11. The process according to claim 8, characterized in that the signals emitted by the measuring device in the supply line and the measuring device in the return line are each analyzed by a respective signal selector, the output of the signal selectors connected to an analyzing element wherein the fuel consumption of the engine is calculated.

12. The process according to claim 7, further including the step of using the signal difference as a warning of a dangerous operating status of the engine.

* * * * *